United States Patent
Howard et al.

(10) Patent No.: US 6,901,516 B1
(45) Date of Patent: May 31, 2005

(54) SYSTEM AND METHOD FOR CIPHERING DATA

(75) Inventors: Brett Howard, Nepean (CA); Peter Selwyn, Lanark (CA); Shawn Lennox, Ottawa (CA); Clayton Cameron, Carleton Place (CA); Michel Lamarche, Vanier (CA); Lorne Flindall, Ottawa (CA); Andrew Robison, Ottawa (CA); Wajdi Feghali, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/244,203

(22) Filed: Feb. 4, 1999

(30) Foreign Application Priority Data

Feb. 4, 1998 (CA) .............................. 2228687

(51) Int. Cl.[7] .............................. H04L 9/00
(52) U.S. Cl. .................. 713/193; 713/192; 380/28; 380/201; 380/207; 380/210; 380/239
(58) Field of Search .................. 380/239, 28, 201, 380/207, 210; 713/192, 193

(56) References Cited

U.S. PATENT DOCUMENTS 5,799,201 A * 8/1998 Lorenz et al. .............. 395/800
6,067,595 A * 5/2000 Lindenstruth ............... 710/129
6,093,213 A * 7/2000 Favor et al. ................ 703/27
6,134,591 A * 10/2000 Nickles ...................... 709/229

* cited by examiner

Primary Examiner—Gregory Morse
Assistant Examiner—Paul Callahan
(74) Attorney, Agent, or Firm—McCarthy Tetrault LLP

(57) ABSTRACT

A system for ciphering data for transmission by a communication device is provided. The system includes a memory device having a memory buffer a first access port connected to the memory buffer and a second access port connected to the memory buffer. The system also has a data processing processor connected to the first access port via a first bus and a ciphering processor connected to the second access port via a second bus. The first access port and the second access port each provide mutually independent access to the memory buffer. The second bus is not connected to the first bus. The data processing processor is adapted to receive the data and provide the data to the memory buffer over the first bus. The ciphering processor is adapted to retrieve the data from the memory buffer over the second bus, generate ciphered data from the data, generate integrity check information for the ciphered data using the data and provide the ciphered data to the memory buffer over the second bus.

22 Claims, 2 Drawing Sheets

SYSTEM AND METHOD FOR CIPHERING DATA

FIELD OF THE INVENTION

The invention relates to a system for decoding serial data received from a communication medium. In particular the invention relates to a system for encoding and/or decoding of data packets and/or fragments received serially interleaved one within another.

BACKGROUND OF THE INVENTION

In the past, security of communications was provided through the use of encryption technologies. When using encryption, data that is communicated is first mapped from its useful state to another obfuscated state wherein it is inaccessible even it intercepted. Before being "used," the data is mapped back to its useful state. Mapping the data is referred to as encoding and mapping the data back is referred to as decoding. The terms encrypting and decrypting, respectively, are also commonly used. There are many methods of obfuscating data having varying degrees of security. Some of these include DES, triple-DES and CAST. Often, security systems support improvements in the encoding algorithms used to enable enhanced security algorithms to later be adopted.

For securing communications, two common models are used, point to point level security and data level security. In point to point level security, two endpoints in a communication medium secure communications therebetween. For example, two radio transceivers for use in military applications set up a secure channel, an agreed upon encoding/decoding method. All data transmitted is encoded prior to transmission and all data is decoded upon receipt. Encoding systems used for data of this type are usually optimized for encoding and decoding data within a stream of data. In data level security, data is encoded into a file and that file is then transmitted. The received encoded file is then decoded to extract the original data. A common form of this type of encoding system is Pretty Good Privacy® (PGP) a commonly available software encryption package for personal computers.

A Secure Virtual Private Network (SVPN) is a secure form of a virtual private network (VPN). A VPN provides an appearance to users of the network of a physically connected network of workstations. This appearance is provided even when some workstations and sub-networks are disposed remotely from the core of the network. As such, a person working from home feels as if they are physically coupled to the network though they are not. Commonly, VPNs are implemented using a wide area network such as the Internet as a communication medium. A workstation is coupled to an Internet provider via a modem connection, the core network is coupled to the Internet through a gateway and the workstation communicates with the network to provide functionality as if a dedicated dial-up connection were made therebetween.

For a user of the workstation, the connection to the Internet and the gateway is transparent. Thus, the term virtual in both VPN and SVPN. An SVPN also comprises means for securing data transmitted via the Internet to the gateway in order to prevent interception and access to sensitive data. Commonly, this means for securing data includes a processor for encrypting and decrypting data. Even if intercepted, the encrypted data is not accessible.

In order to support data level security of SVPN communication, data is received at a gateway and is transferred from gateway memory to working memory where the data "pieces" are reassembled to form complete messages and/or transmissions. These complete messages and/or transmissions are then decoded and the data then routed within the private network to a destination. Alternatively, the data is re-encoded and transmitted back through the SVPN to the destination. Thus, a gateway has to support receiving data within a serial stream, processing the data to determine an associated data location within memory, transferring the incoming data to the associated location in memory and monitoring memory locations for complete messages that require decoding. This requires costly hardware and complicated timing to support memory transfers, serial data stream reception and file decoding.

A common approach to securing data is to use a main processor within a gateway to perform data ciphering operations. Data ciphering includes encoding and decoding of data. Once data is ciphered, operations relating to data integrity such as hashing the data is performed. Data to be transmitted is encrypted and hashed, with hashed data added to the encrypted data. Data received is verified and then decrypted.

The processor accesses a memory buffer to read and write data before and after processing it. Unfortunately, data bus access is a common bottleneck in processor based systems. The prior art approach described above requires four memory access operations—writing received data to the buffer, reading the data for processing, writing the data after processing, and reading the data for forwarding same to a destination. Thus, even though a processor is often fast enough to handle the requisite processing, the bus access limits the overall efficiency of such a system.

It would be advantageous to simplify the ciphering of data within a serial data stream when received by the gateway.

In order to overcome the above limitations of the prior art, it is an aspect of the invention to provide a method of ciphering data received by a gateway, the data ciphered absent accessing the memory buffer via the data bus.

It is an aspect of the invention to provide a method of encoding data for transmission via a wide area network, the data ciphered and processed for determining integrity in parallel.

SUMMARY OF THE INVENTION

In the first aspect, a system for ciphering a packet in a data stream received by a communication device is provided. The system includes a memory device having a memory buffer, a first access port connected to the memory buffer and a second access port connected to the memory buffer. The system includes a first communication port for receiving the data stream and a second communication port for transmitting a ciphered data stream associated with the data stream. The system also has a data processing processor connected to the communication ports and the first access port via a first bus and a ciphering processor connected to the second access port via a second bus. The first access port and the second access port each provide access to the memory buffer. The data processing processor is adapted to receive the data stream and provide it to the memory buffer over the first bus, to identify a start and an end of the packet, to store a file associated with the packet in the memory buffer through the first bus and to retrieve the ciphered data stream from the memory buffer through the first bus for transmission through the second communication port. The data processor includes a security module to determine a security context relating to at least one source of the data stream and a destination for the ciphered data stream, to store the security context in the memory buffer for access by the ciphering processor and to retrieve a given security context from the memory buffer for use in generating the ciphered data stream. The ciphering processor is adapted to retrieve the file from the memory buffer over the second bus, generate the ciphered data stream from the file, generate integrity check information for the ciphered data stream using the file and provide the ciphered data stream to the memory buffer over the second bus.

The ciphering processor may include an encryption module for generating the ciphered data and a module for generating the integrity check information. The module may be a hashing module.

The encryption module may include a DES encryption module for performing one of DES and triple-DES encryption.

The module may include a HMAC hashing module for encoding the integrity check information within the ciphered data.

The memory buffer may include dual port random access memory.

The data processing processor may include a security address module. The security address module may store an address associated with the security context in the memory buffer. The address may be based on the source of the data or the destination for the ciphered data.

The security module may provide an indication to the data processing processor when a security context is not present in the memory buffer.

The data processing processor may operate asynchronously to the ciphering processor.

The data processing processor may be clocked by a first clock source and the ciphering processor may be clocked by a second clock source. The first clock source may be asynchronous to the second clock source.

The data received at the first communications port may include fragments of a packet. The data processing processor may store the fragments in the memory buffer to assemble the packet. The ciphering processor may generate the ciphered data stream from the assembled packet.

The system may be disposed at a gateway between a private network and a public network in a secure virtual private network. The first communications port may be connected to the private network or the public network and the second communications port may be connected to the other one of the private network and the public network.

In a second aspect, a method for ciphering a packet in a data stream received by a communication device is provided. The device has a first communication port for receiving the data stream, a second communication port for transmitting a ciphered data strewn associated with the data stream, a memory device, a data processing processor connected to the first and second communication ports and the access port via a first bus and a ciphering processor connected to the second access port via a second bus. The memory device includes a memory buffer and a first and a second access ports connected to the memory buffer. The method comprises receiving the data stream from the first communication port for processing by the data processing processor; identifying a start and an end of the packet by the data processing processor; storing a file associated with the packet in the memory buffer by the data processing processor through the first bus; retrieving the file from the memory buffer by the ciphering processor over the second bus; generating the ciphered data stream from the file by the ciphering processor; generating integrity check information for the ciphered data stream using contents of the file by the ciphering processor; and providing the ciphered data stream to the second communication port; retrieving a security context from memory for use in generating the ciphered data stream; determining a security context relating to at least one of a source of the data stream and a destination for the ciphered data stream; and storing the security context in the memory buffer. The stored security context is accessible by the ciphering processor.

The ciphered data stream may be generated by an encryption module in the ciphering processor and the integrity check information may be generated by a hashing module in the ciphering processor.

The ciphering processor may include an encryption module for generating the ciphered data stream and a module for generating the integrity check information.

The encryption module may perform one of DES and triple-DES encrytion utilizing a DES encryption module.

The hashing module may encode the integrity check information within the ciphered data stream utilizing a HMAC hashing module.

The memory buffer may comprise dual port random access memory.

The data processing processor may store an address associated with the security context in the memory buffer. The address may be based on at least one of the source of the data stream and the destination for the ciphered data stream.

The security module may provide an indication to the data processing processor when a security context is not present in the memory buffer.

The data processing processor may be clocked by a first clock source, the ciphering processor may be clocked by a second clock source and the first clock source may be asynchronous to the second clock source.

In a third aspect, a system for ciphering packet in a data stream received by a communication device is provided. The system includes a first communication port for receiving the data stream; a second communication port for transmitting a ciphered data stream associated with the data stream; and a memory having a memory buffer, a first access port connected to the memory buffer, and a second access port connected to the memory buffer. The system includes a data processing processor connected to the first communication port, the second communication port and the first access port via a first bus. The data processor includes a security module to determine a security context relating to at least one source of data stream and a destination for the ciphered data stream, to store the security context in the memory buffer for access by the ciphering processor and to retrieve a given security context from the memory buffer for use in generating the ciphered data stream. The system includes a ciphering processor connected to the second access port via a secon bus. The first access port and second access port each provide access to the memory buffer, and the ciphering processor provides the ciphered data stream to the memory buffer through the second bus.

BRIEF DESCRIPTION OF THE DRAWINGS

The invention will now be described in conjunction with the following drawings in which.

DETAILED DESCRIPTION OF THE INVENTION

Figure 1:
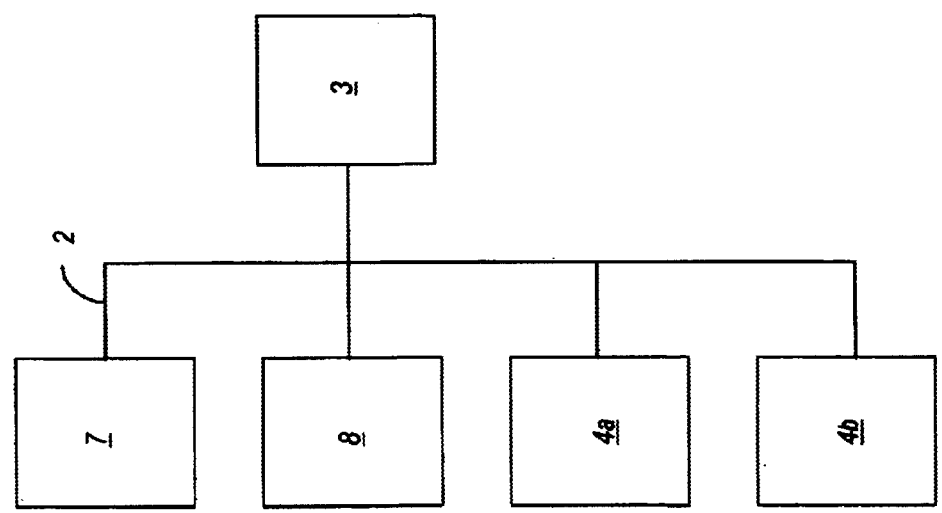
FIG. 1 is a simplified block diagram of a prior art ciphering system.

Referring to FIG. 1, a data ciphering system according to the prior art is shown. The data is provided as a stream of data values in the form of bits. As shown, the bits arrive at a first communication port 4a and are stored in buffer memory 3 via the data bus 2. A processor 7 determines start locations and end locations of packet fragments as the bits are placed within the buffer memory 3. Alternatively, this is done when bits are already within the buffer memory 3. Determining packet start, end, and contents are known in the art of data communications.

When the beginning of a packet is detected by the processor 7, a new file within the memory is created or a new portion of the memory is allocated for the packet. A ciphering circuit 8 then retrieves the file from the memory buffer 3 via the data bus 2. The data within the buffer memory 3 is ciphered and data integrity information is generated for data integrity verification. The ciphered data is then stored in the buffer memory 3 via the data bus 2. When data is being secured for transmission via a wide area network, the integrity information is stored with the ciphered information. The processor 7 then retrieves the ciphered information from the buffer memory 3 via the data bus 2 and provides it to the second communication port 4b.

From FIG. 1 and the above description, it is evident that at least four data bus operations are necessary for each packet. Since data busses often form a bottleneck in system performance, the resulting system is often inefficient. Even though all processing of encryption and data integrity is performed by a special processor 8, the resulting improvement in system performance is not substantial.

Figure 2:
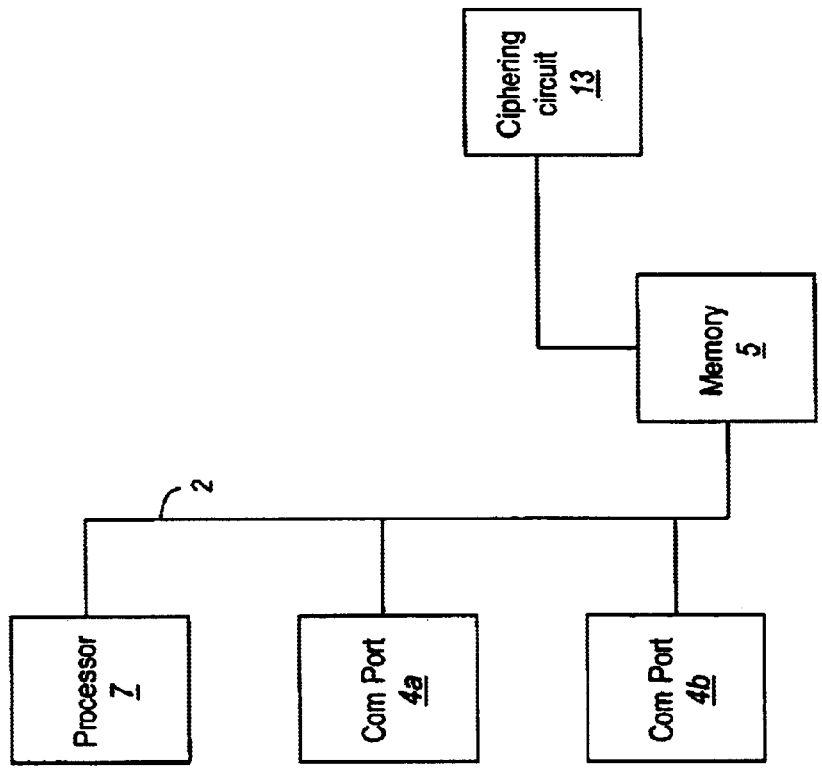
FIG. 2 is a simplified block diagram of a ciphering system according to the invention; and, FIG. 3 is a simplified block diagram of a ciphering processor for use with the present invention.

Referring to FIG. 2, a data ciphering system according to the invention is shown. The data is provided as a stream of data values in the form of bits. As shown, the bits arrive at a first communication port 4a and are stored in buffer memory 5. A processor 7 determines start locations and end locations of packet fragments as the bits are placed within the buffer memory 5. Alternatively, this is done when bits are already within the buffer memory 5. Determining packet start, end, and contents are known in the art of data communications.

When the beginning of a packet is detected by the processor 7, a new file within the buffer memory 5 is created. A ciphering processor 13 then retrieves the file from the buffer memory 5 via a second other data bus. The data within the buffer memory 5 is ciphered and data integrity information is generated for data integrity verification. The ciphered data is then stored. When data is being secured for transmission via a wide area network, the integrity information is stored with the ciphered information. The processor 7 then retrieves the ciphered information and provides it to the second communication port 4b.

Clearly, processing of a packet requires at least two data bus operations, half of the prior art implementation. Thus, using a system as described herein, performance is improved substantially. Also, since the ciphering processor 13 operates independent of the processor 7 and of the data bus 2, it is possible to clock the ciphering processor 13 independent of the other processor 7. Therefore, when ciphering operations prove to be a bottleneck, a faster ciphering processor 13 is used. Alternatively, when the processor 7 is the bottleneck, a faster processor 7 is used.

The buffer memory 5 is preferably formed of dual ported random access memory. Of course, when reduced performance is acceptable, a random access memory arbitration circuit (not shown) is used to arbitrate access to the random access memory making it function similarly to dual ported memory. In essence, either the ciphering processor 13 or the processor 7 are switched to drive the memory circuitry. By using true dual ported random access memory, both the processor 7 and the ciphering processor 13 can access the buffer memory 5 simultaneously. This effectively eliminates operations of one processor from affecting operation the other.

At least four memory access operations are required to process a packet; however, they are now performed two on the data bus 2 and two on a second other data bus. This is highly advantageous as described above.

The implementation of ciphering and data integrity operations in parallel improves system performance. Prior art systems perform one operation and then the other. Implementation of the two operations in parallel requires some set up operations and a final operation of the data integrity processing. That said, it reduces two sequential operations to one operation equal to the greater of the two. The improved efficiency allows for a ciphering processor 13 having reduced performance and yet capable of achieving a same overall data throughput.

Figure 3:
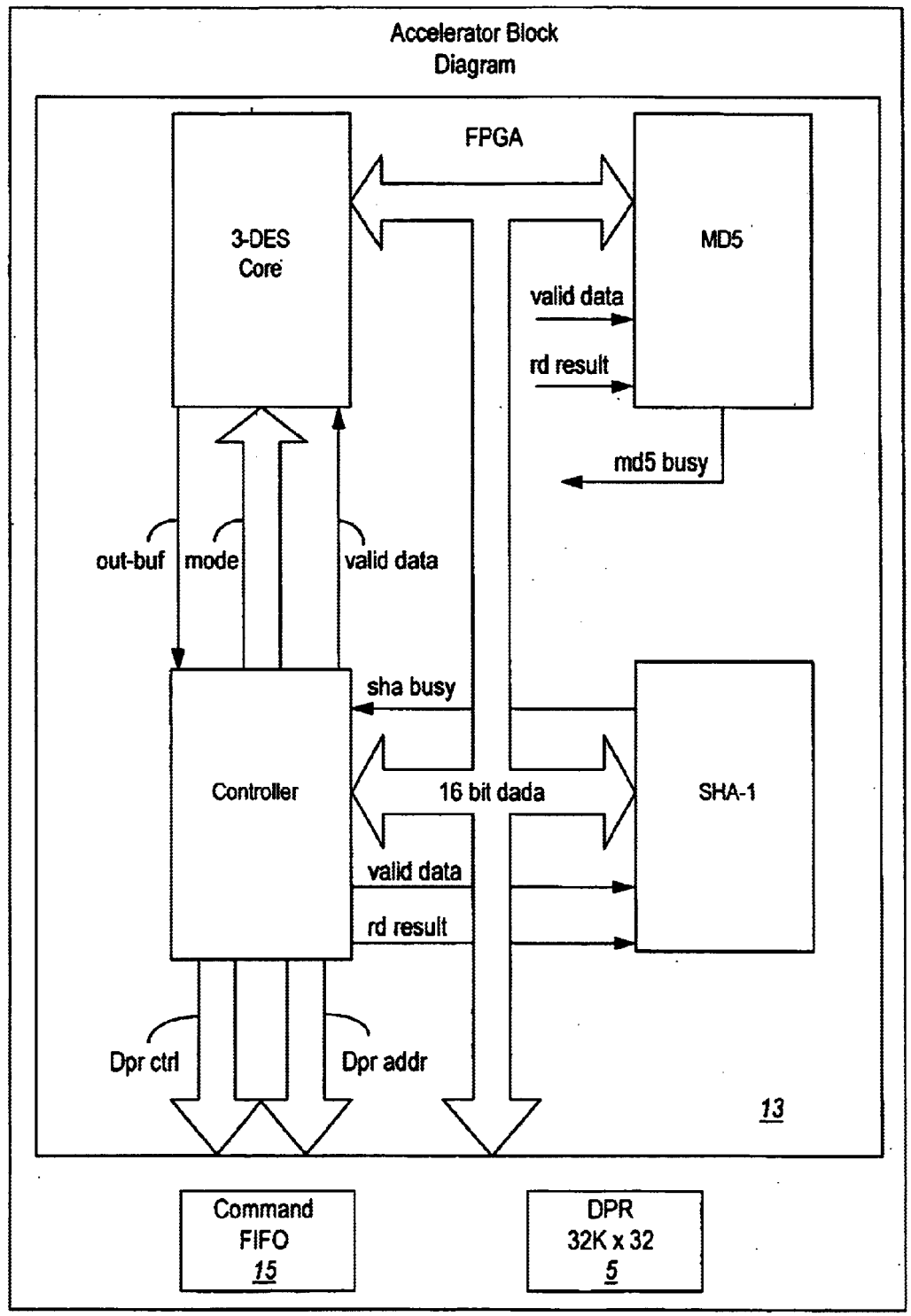

Referring to FIG. 3, a block diagram of the ciphering processor 13 is shown. The ciphering processor 13 is implemented within programmable logic of a field programmable gate array (FPGA). The FPGA is in communication with the dual ported random access memory 5 and with a command FIFO 15. The ciphering processor 13 comprises four main blocks. The 3-DES core is a ciphering block for performing encryption and decryption of data according to the DES standard. Of course, other methods of data obfuscation may be implemented in conjunction with the DES core. Alternatively, another form of encryption is used in place of DES. An SHA-1 block implements SHA-1 data integrity hashing and verification. The block provides a signal related to the integrity of data analysed. When data integrity is verified, that data is acceptable and the processed packet continues normal processing, otherwise an error is indicated and an error handler sends appropriate signals for indicating the communication error. An MD5 block performs data integrity hashing and verification according to MD5. As used herein the term data integrity hashing is equivalent to message digesting (MD). The DES, MD5, and SHA-1 methods are well known in the art.

For example, the Secure Hash Algorithm (SHA), the algorithm specified in the Secure Hash Standard (SHS, FIPS PUB 180), was developed by NIST. SHA-1 is a revision to SHA that was published in 1994; the revision corrected an unpublished flaw in SHA. The design of SHA-1 is very similar to the MD4 family of hash functions developed by Rivest. SHA-1 is also described in the ANSI X9.30 (part 2) standard. MD2, MD4 and MD5 are message-digest algorithms developed by Rivest.

Thus, it is clear that implementation of these functions in parallel within a single ciphering processor is advantageous. Further, since the processed data is the same data in both functions, the use of a single integrated processor reduces memory access operations since the same data is used by each of the processing portions of the ciphering processor 13. This has an added advantage of increasing performance through reduced access to external memory.

When a packet is ciphered according to the invention and results in a packet that is too large for transmission via a network, the packet is fragmented. Such a packet has two fragments. In this case, the receiving end may be optimized to process paired fragments.

By performing encryption and integrity encoding in a single pass, very high speeds are supported efficiently. For example, encryption according to the IPsec standard is performed and integrity encoding using message digests is performed. Of course, very high speeds can be supported through other architectures.

A hardware implementation of a gateway ciphering system is implemented within an ASIC or other custom circuitry. Alternatively, a commercially available processor is dedicated to performing the ciphering processing. This provides very high performance and processor independence. In effect, the use of custom circuitry allows for increased efficiency in exchange for increased design and implementation costs. Alternatively, the hardware is implemented in programmable logic such as a field programmable gate array (FPGA).

Advantageously, a hardware implementation as disclosed above offloads much of the processing requirements for packet processing from a host processor. The resulting system has a host processor and a ciphering processor that are relatively independent. Unfortunately, a level of independence achieved is generally at an expense of further processing ability within the ciphering processor. For example, in order to cipher a packet, it is generally required to have a security association for the packet. In order to determine the security association, either the ciphering processor is significantly more complex or the host processor is used.

Accordingly, an architecture is presented below for providing a balance between cost and performance for a ciphering system according to the invention. The host processor determines a security association based on a source/destination of a packet. The security association and the source/destination in the form of an address are stored for access by the ciphering processor. In this fashion, the host processor determines a security association for an address once instead of many times. Likewise, the ciphering processor is capable of ciphering many packets without further processing by the host processor and with little added complexity.

The ciphering system in the form of an ASIC or an FPGA includes means to look up the security association determined by the host processor. The security association is, for example, a security context in which a packet is to be ciphered including keys and ciphering algorithms. The host processor includes means for determining a security association and for storing the determined security association in a location accessible by the ciphering processor. For example, the security association is stored in the dual ported RAM. Alternatively, the security association is stored in memory within the ciphering processor.

In use, the ciphering processor receives a packet. An address for the packet is determined and a security context associated with the packet address is located when present. The located security context is then used to cipher the packet. Alternatively, when the security context is not present, a signal is provided to the host processor which then determines and stores a security context for the packet. Such a method shifts much of the packet processing requirements from the host processor to the ciphering processor in an efficient and cost effective manner.

Accordingly, the host processor performs key negotiation and setup. It also stores data within a table, which the ciphering processor later references. The ciphering processor then processes all subsequent packets in that security context without burdening the host processor. Further, since the ciphering processor need only perform a lookup for each packet, the complexity of the hardware and per-packet overhead are both small.

Numerous other embodiments may be envisaged without departing from the spirit or scope of the invention.

What is claimed is:

1. A system for ciphering a packet in a data stream received by a communication device, said system comprising:
   a first communication port for receiving said data stream;
   a second communication port for transmitting a ciphered data stream associated with said data stream;
   a memory device having
      a memory buffer;
      a first access port connected to said memory buffer; and
      a second access port connected to said memory buffer;
   a data processing processor connected to said first communication port, said second communication port and said first access port via a first bus; and
   a ciphering processor connected to said second access port via a second bus,
   wherein said first access port and said second access port each provide access to said memory buffer; said data processing processor is adapted to receive said data stream from said first communication port through said first bus, to identify a start and an end of said packet, to store a file associated with said packet in said memory buffer through said first bus and to retrieve said ciphered data from said memory buffer through said first bus for transmission through said second communications port; said data processor further comprises a security module to determine a security context relating to at least one source of said data stream and a destination for said ciphered data stream, to store said security in said memory buffer for access by said ciphering processor and to retrieve a given security context from said memory buffer for use in generating said ciphered data stream; and said ciphering processor is adapted to retrieve said file from said memory buffer over said second bus to generate said ciphered data stream from said file, to generate integrity check information for said ciphered data stream using contents of said file and to provide said ciphered data stream to said memory buffer through said second bus.

2. The system for ciphering a packet in a data stream as claimed in claim 1, wherein said ciphering processor includes an encryption module for generating said ciphered data stream and a hashing module for generating said integrity check information.

3. The system for ciphering a packet in a data stream as claimed in claim 1, wherein said ciphering processor includes an encryption module for generating said ciphered data stream and a module for generating said integrity check information.

4. The system for ciphering a packet in a data stream as claimed in claim 2, wherein said encryption module includes a DES encryption module for performing one of DES and triple-DES encryption.

5. The system for ciphering a packet in a data stream as claimed in claim 2, wherein said hashing module includes a HMAC hashing module for encoding said integrity check information within said ciphered data stream.

6. The system for ciphering a packet in a data stream as claimed in claim 1, wherein said memory buffer comprises dual port random access memory.

7. The system for ciphering a packet in a data stream as claimed in claim 2, wherein said data processing processor comprises a security address module, said security address module stores in address associated with said security context in said memory buffer, said address based on said at least one of said source of said data stream and said destination for said ciphered data stream.

8. The system for ciphering a packet in a data stream as claimed in claim 7, wherein said security module provides an indication to said data processing processor when a security context is not present in said memory buffer.

9. The system for ciphering a packet in a data stream as claimed in claim 1, wherein said data processing processor operates asynchronously to said ciphering processor.

10. The system for ciphering a packet in a data stream as claimed in claim 9, wherein said data processing processor is clocked by a first clock source, said ciphering processor is clocked by a second clock source and said first clock source is asynchronous to said second clock source.

11. The system for ciphering a packet in a data stream as claimed in claim 10, wherein said data stream received at said first communications port comprises fragments of a packet, said data processing processor stores said fragments in said memory buffer to assemble said packet and said ciphering processor generates said ciphered data stream from said assembled packet.

12. The system for ciphering a packet in a data stream as claimed in claim 11, wherein said system is disposed at a gateway between a private network and a public network in a secure virtual private network, said first communications port is connected to one of said private network and said public network and said second communications port is connected to another one of said private network and said public network.

13. A method for ciphering a packet in a data stream received by a communication device having a first communication port for receiving said data stream, a second communication port for transmitting a ciphered data stream associated with said data stream, a memory device including a memory buffer and a first and a second access ports connected to said memory buffer, said communication device further having a data processing processor connected to said first communication port, said second communication port and said access port via a first bus and a ciphering processor connected to said second access port via a second bus, said method comprising:

receiving said data stream from said first communication port for processing by said data processing processor;

identifying a start and an end of said packet by said data processing processor;

storing a file associated with said packet in said memory buffer by said data processing processor through said first bus;

retrieving said file from said memory buffer by said ciphering processor over said second bus;

generating said ciphered data stream from said file by said ciphering processor;

generating integrity check information for said ciphered data stream using contents of said file by said ciphering processor;

providing said ciphered data stream to said second communication port;

retrieving a security context from memory for use in generating said ciphered data stream;

determining a security context relating to at least one of a source of said data stream and a destination for said ciphered data stream; and storing said security context in said memory buffer, said security context stored being accessible by said ciphering processor.

14. The method for ciphering a packet in a data stream as claimed in claim 13, wherein said ciphered data stream is generated by an encryption module in said ciphering processor and said integrity check information is generated by a hashing module in said ciphering processor.

15. The method for ciphering a packet in a data stream as claimed in claim 14, wherein said ciphering processor includes an encryption module for generating said ciphered data stream and a module for generating said integrity check information.

16. The method for ciphering a packet in a data stream as claimed in claim 15, wherein said encryption module further performs one of DES and triple-DES encryption utilizing a DES encryption module.

17. The method for ciphering a packet in a data stream as claimed in claim 16, wherein said hashing module further encodes said integrity check information within said ciphered data stream utilizing a HMAC hashing module.

18. The method for ciphering a packet in a data stream as claimed in claim 17, wherein said memory buffer comprises dual port random access memory.

19. The method for ciphering a packet in a data stream as claimed in claim 18, wherein said data processing processor further stores an address associated with said security context in said memory buffer, said address based on said at least one of said source of said data stream and said destination for said ciphered data stream.

20. The method for ciphering a packet in a data stream as claimed in claim 19, wherein said security module provides an indication to said data processing processor when a security context is not present in said memory buffer.

21. The method for ciphering a packet in a data stream as claimed in claim 20, wherein said data processing processor is clocked by a first clock source, said ciphering processor is clocked by a second clock source and said first clock source is asynchronous to said second clock source.

22. A system for ciphering a packet in a data stream received by a communication device, said system comprising:

a first communication port for receiving said data stream;

a second communication port for transmitting a ciphered data stream associated with said data stream;

a memory device having
a memory buffer;
a first access port connected to said memory buffer; and
a second access port connected to said memory buffer;

a data processing processor connected to said first communication port, said second communication port and said first access port via a first bus, said data processor comprising a security module to determine a security context relating to at least one source of said data stream and a destination for said ciphered data stream, to store said security context in said memory buffer for access by said ciphering processor and to retrieve a given security context from said memory buffer for use in generating said ciphered data stream; and a ciphering processor connected to said second access port via a second bus, wherein said first access port and said second access port each provide access to said memory buffer; and said ciphering processor provides said ciphered data stream to said memory buffer through said second bus.

* * * * *

UNITED STATES PATENT AND TRADEMARK OFFICE
CERTIFICATE OF CORRECTION

PATENT NO. : 6,901,516 B1  
APPLICATION NO. : 09/244203  
DATED : May 31, 2005  
INVENTOR(S) : Brett Howard et al.

It is certified that error appears in the above-identified patent and that said Letters Patent is hereby corrected as shown below:

Claim 1, column 8, line 37: Insert the word -- context -- after the word "security".

Claim 7, column 9, line 4: Replace the word "in" with the word -- an --.

Column 4, line 4: Delete the word "and".

Column 4, line 36: Insert the word -- a -- before the word "packet".

Column 4, line 48: Insert the word -- the -- before the first occurrence of the word "data".

Column 4, line 53: Replace the word "secon" with the word -- second --.

Column 5, line 18: Insert the word -- buffer -- before the word "memory" and delete the word "buffer" after the word "memory".

Signed and Sealed this

Fourth Day of March, 2008

JON W. DUDAS  
*Director of the United States Patent and Trademark Office*